(12) United States Patent
Pandita et al.

(10) Patent No.: US 9,887,979 B1
(45) Date of Patent: Feb. 6, 2018

(54) SYSTEMS AND METHODS FOR ENABLING USERS TO LAUNCH APPLICATIONS WITHOUT ENTERING AUTHENTICATION CREDENTIALS

(71) Applicant: Symantec Corporation, Mountain View, CA (US)

(72) Inventors: Sunil Pandita, New Delhi (IN); Saurabh Agrawal, Vinoba Nagar Bilaspu (IN); Prasad Agarmore, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 231 days.

(21) Appl. No.: 14/968,935

(22) Filed: Dec. 15, 2015

(51) Int. Cl.
*G06F 21/44* (2013.01)
*H04L 29/06* (2006.01)

(52) U.S. Cl.
CPC .................................. *H04L 63/08* (2013.01)

(58) Field of Classification Search
CPC ................................ H04L 63/08; G06F 21/44
See application file for complete search history.

(56) References Cited

U.S. PATENT DOCUMENTS

| | | | | |
|---|---|---|---|---|
| 2003/0200465 A1* | 10/2003 | Bhat | ................... | H04L 63/0815 726/8 |
| 2013/0081126 A1* | 3/2013 | Soukup | ............... | H04L 63/0815 726/8 |

OTHER PUBLICATIONS

Sameer Ranade; Systems and Methods for Generating Full Backups of Applications; U.S. Appl. No. 14/936,705, filed Nov. 10, 2015.
"Access token", https://en.wikipedia.org/wiki/Access_token, as accessed Oct. 22, 2015, Wikipedia, (Feb. 19, 2011).
"Manifest file", https://en.wikipedia.org/wiki/Manifest_file, as accessed Oct. 22, 2015, Wikipedia, (Jan. 7, 2008).

\* cited by examiner

*Primary Examiner* — Izunna Okeke
(74) *Attorney, Agent, or Firm* — FisherBroyles, LLP

(57) ABSTRACT

The disclosed computer-implemented method for enabling users to launch applications without entering authentication credentials may include (1) receiving, at a server that hosts an application that requests authentication credentials from users before allowing the users to access the application, a request from an endpoint device to download the application, the request including a user token that identifies a user of the endpoint device, (2) in response to receiving the request, authenticating the user token within the request, (3) creating an authenticated version of the application by adding, to the application, an indication that the user token has been authenticated, (4) distributing the authenticated version of the application to the endpoint device, where the endpoint device (A) identifies, within the authenticated version of the application, the indication that the user token has been authenticated and (B) launches the authenticated version of the application without requiring the user to enter authentication credentials.

18 Claims, 7 Drawing Sheets

SYSTEMS AND METHODS FOR ENABLING USERS TO LAUNCH APPLICATIONS WITHOUT ENTERING AUTHENTICATION CREDENTIALS

BACKGROUND

Organizations may wish to provide users within the organizations with various types of applications for their mobile and non-mobile devices (e.g., iOS devices). For example, an organization may employ an Enterprise Mobility Management (EMM) vendor to create and/or distribute an application to each user within the organization. To control the accessibility and/or security of some applications, EMM vendors may require that users authenticate or register their devices when installing or launching the applications.

Unfortunately, many user-authentication processes may require that users enter complicated usernames and passwords, navigate through multiple tabs, and/or complete additional inconvenient or cumbersome tasks. Traditional systems for facilitating users to enter authentication credentials may reduce the number of steps required for authentication (e.g., by eliminating multiple user interfaces within an authentication process), but may not eliminate the need for a user to enter a username and/or password. As such, the instant disclosure identifies and addresses a need for improved systems and methods for enabling users to launch applications without entering authentication credentials.

SUMMARY

As will be described in greater detail below, the instant disclosure describes various systems and methods for enabling users to launch applications without entering authentication credentials by creating an authenticated version of an application that authenticates a particular user in response to receiving a request from the user to download the application. The disclosed systems and methods may then distribute the authenticated version of the application to the user's endpoint device, where the user's endpoint device may determine that the application has been authenticated and launch the application without requiring the user to enter any authentication credentials.

In one example, a computer-implemented method for enabling users to launch applications without entering authentication credentials may include (1) receiving, at a server that hosts an application that requests authentication credentials from users while the application is launching and before allowing the users to access the application, a request from an endpoint device to download the application, the request including a user token that identifies a user of the endpoint device, (2) in response to receiving the request, authenticating the user token within the request, (3) after authenticating the user token, creating an authenticated version of the application by adding, to the application, an indication that the user token has been authenticated, (4) distributing the authenticated version of the application to the endpoint device, where, in response to the user initiating a launch of the authenticated version of the application, the authenticated version of the application identifies, within the authenticated version of the application, the indication that the user token has been authenticated and the endpoint device launches the authenticated version of the application without requiring the user to enter authentication credentials.

In some examples, the method may further include generating the user token that identifies the user of the endpoint device prior to receiving the request from the endpoint device to download the application. In these examples, the method may also include distributing the user token to the user of the endpoint device in an electronic message that prompts the user to request to download the application. In some embodiments, the electronic message may prompt the user to click a hyperlink that includes the user token. In such embodiments, authenticating the user token within the request may include identifying the user token within a uniform resource locator (URL) of the hyperlink.

In some examples, adding the indication that the user token has been authenticated to the application may include creating at least one new empty directory within the application. In these examples, the method may also include naming the new empty directory based on the authenticated user token.

In some embodiments, the application may have been signed by a publisher of the application. In such embodiments, adding the indication that the user token has been authenticated to the application may be performed without re-signing the application.

In some examples, the server may store authentication credentials of the user that authenticate the user to the application. In these examples, the endpoint device may launch the authenticated version of the application without requiring the user to enter authentication credentials by (1) sending the user token to the server in a request to receive the authentication credentials that authenticate the user to the application, (2) receiving, from the server, the authentication credentials that authenticate the user to the application, and (3) supplying the authentication credentials to the application.

In one embodiment, a system for implementing the above-described method may include (1) a reception module that receives, at a server that hosts an application that requests authentication credentials from users while the application is launching and before allowing the users to access the application, a request from an endpoint device to download the application, the request including a user token that identifies a user of the endpoint device, (2) an authentication module that authenticates the user token within the request in response to receiving the request, (3) a creation module that creates, after the user token is authenticated, an authenticated version of the application by adding, to the application, an indication that the user token has been authenticated, and (4) a distribution module that distributes the authenticated version of the application to the endpoint device, where, in response to the user initiating a launch of the authenticated version of the application, the authenticated version of the application identifies, within the authenticated version of the application, the indication that the user token has been authenticated and the endpoint device launches the authenticated version of the application without requiring the user to enter authentication credentials. In addition, the system may include at least one hardware processor configured to execute the reception module, the authentication module, the creation module, and the distribution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, at a server that hosts an application that requests authentication credentials from users while the application is launching and before allowing the users to access the application, a request from an endpoint device to download the application, the request including a user token that identifies a user of the endpoint device, (2) in response to receiving the request, authenticate the user token within the request, (3) after authenticating the user token, create an authenticated version of the application by adding, to the application, an indication that the user token has been authenticated, (4) distribute the authenticated version of the application to the endpoint device, where, in response to the user initiating a launch of the authenticated version of the application, the authenticated version of the application identifies, within the authenticated version of the application, the indication that the user token has been authenticated and the endpoint device launches the authenticated version of the application without requiring the user to enter authentication credentials.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
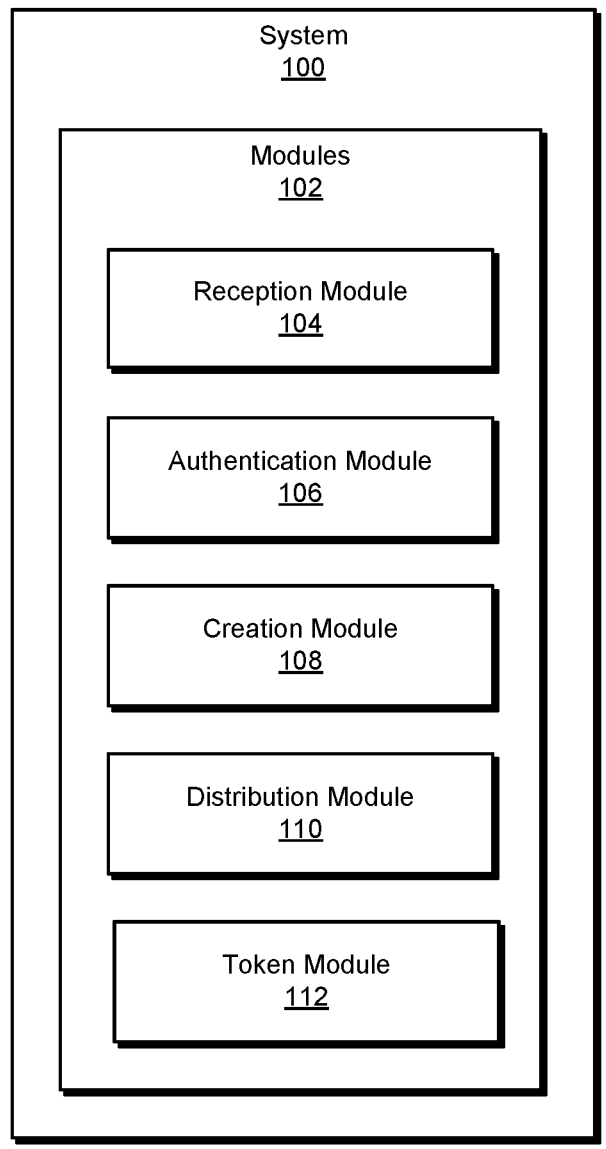
FIG. 1 is a block diagram of an exemplary system for enabling users to launch applications without entering authentication credentials.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling users to launch applications without entering authentication credentials. As will be explained in greater detail below, by adding an indication to an application that a user has been authenticated to the application before the user downloads the application, the systems and methods described herein may enable the user to launch the application without requiring the user to provide authentication credentials to the application. As such, the disclosed systems and methods may prevent or eliminate inconvenient, time-consuming, and/or cumbersome authentication tasks for users attempting to launch applications, while still ensuring that unauthorized users and/or computing devices do not access the applications.

Figure 2:
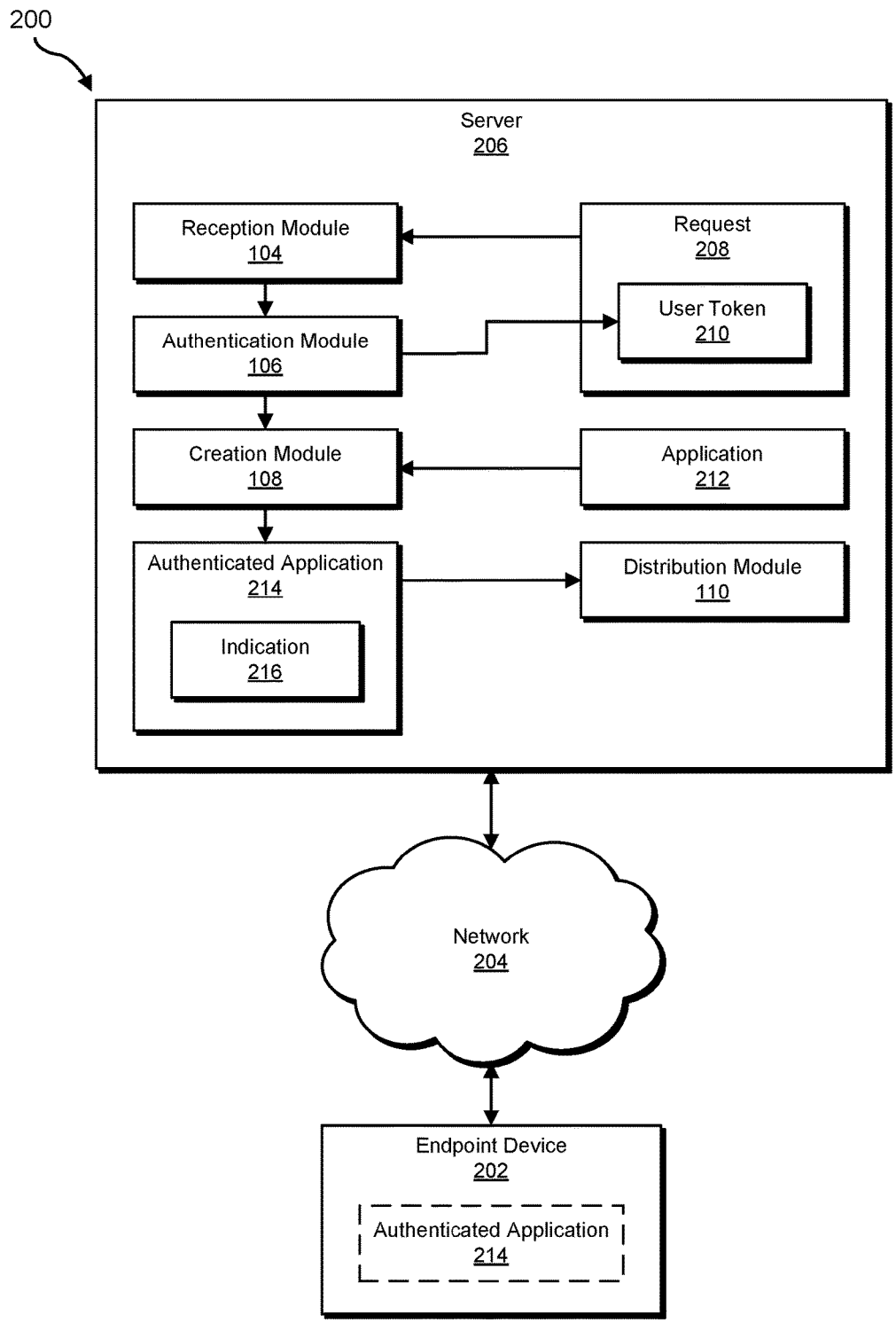
FIG. 2 is a block diagram of an additional exemplary system for enabling users to launch applications without entering authentication credentials.

The following will provide, with reference to FIGS. 1 and 2, detailed descriptions of exemplary systems for enabling users to launch applications without entering authentication credentials. Detailed descriptions of corresponding computer-implemented methods will also be provided in connection with FIGS. 3 and 5. In addition, detailed descriptions of exemplary electronic messages sent to users that prompt the users to download an application will be provided in connection with FIG. 4. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for enabling users to launch applications without entering authentication credentials. As illustrated in this figure, exemplary system 100 may include one or more modules 102 for performing one or more tasks. For example, and as will be explained in greater detail below, exemplary system 100 may include a reception module 104 that that receives, at a server that hosts an application that requests authentication credentials from users while the application is launching and before allowing the users to access the application, a request from an endpoint device to download the application, the request including a user token that identifies a user of the endpoint device. Exemplary system 100 may also include an authentication module 106 that that authenticates the user token within the request in response to receiving the request.

In addition, and as will be described in greater detail below, exemplary system 100 may include a creation module 108 that that creates, after the user token is authenticated, an authenticated version of the application by adding, to the application, an indication that the user token has been authenticated. Furthermore, exemplary system 100 may include a distribution module 110 that distributes the authenticated version of the application to the endpoint device. Finally, exemplary system 100 may include a token module 112 that generates the user token that identifies the user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include an endpoint device 202 in communication with a server 206 via a network 204. In the example of FIG. 2, server 206 may be programmed with one or more of modules 102. In this example, server 206 may operate a server-side application-authentication service that provides authenticated versions of applications to one or more computing devices (such as endpoint device 202). In other examples, at least a portion of the systems described herein may operate client-side on endpoint device 202.

In one embodiment, one or more of modules 102 from FIG. 1 may, when executed by at least one processor of server 206, enable server 206 to enable users to launch applications without entering authentication credentials. For example, and as will be described in greater detail below, reception module 104 may cause server 206 to receive a request 208 from endpoint device 202 to download an application 212, and request 208 may include a user token 210 that identifies a user of endpoint device 202. In response to request 208, authentication module 106 may cause server 206 to authenticate user token 210 within request 208. After user token 210 is authenticated, creation module 108 may cause server 206 to create an authenticated application 214 by adding, to application 212, an indication 216 that indicates user token 210 has been authenticated. Finally, distribution module 110 may cause server 206 to distribute authenticated application 214 to endpoint device 202, where, in response to the user initiating a launch of authenticated application 214, authenticated application 214 identifies indication 216 within authenticated application 214 and endpoint device 202 launches authenticated application 214 without requiring the user to enter authentication credentials.

Endpoint device 202 generally represents any type or form of computing device capable of reading computer-executable instructions. Examples of endpoint device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In exemplary embodiments, endpoint device 202 may represent a device configured to run an iOS operating system, such as an iPHONE, iPAD, or iPOD.

Server 206 generally represents any type or form of computing device that is capable of hosting, authenticating, and/or distributing applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between endpoint device 202 and server 206.

Figure 3:
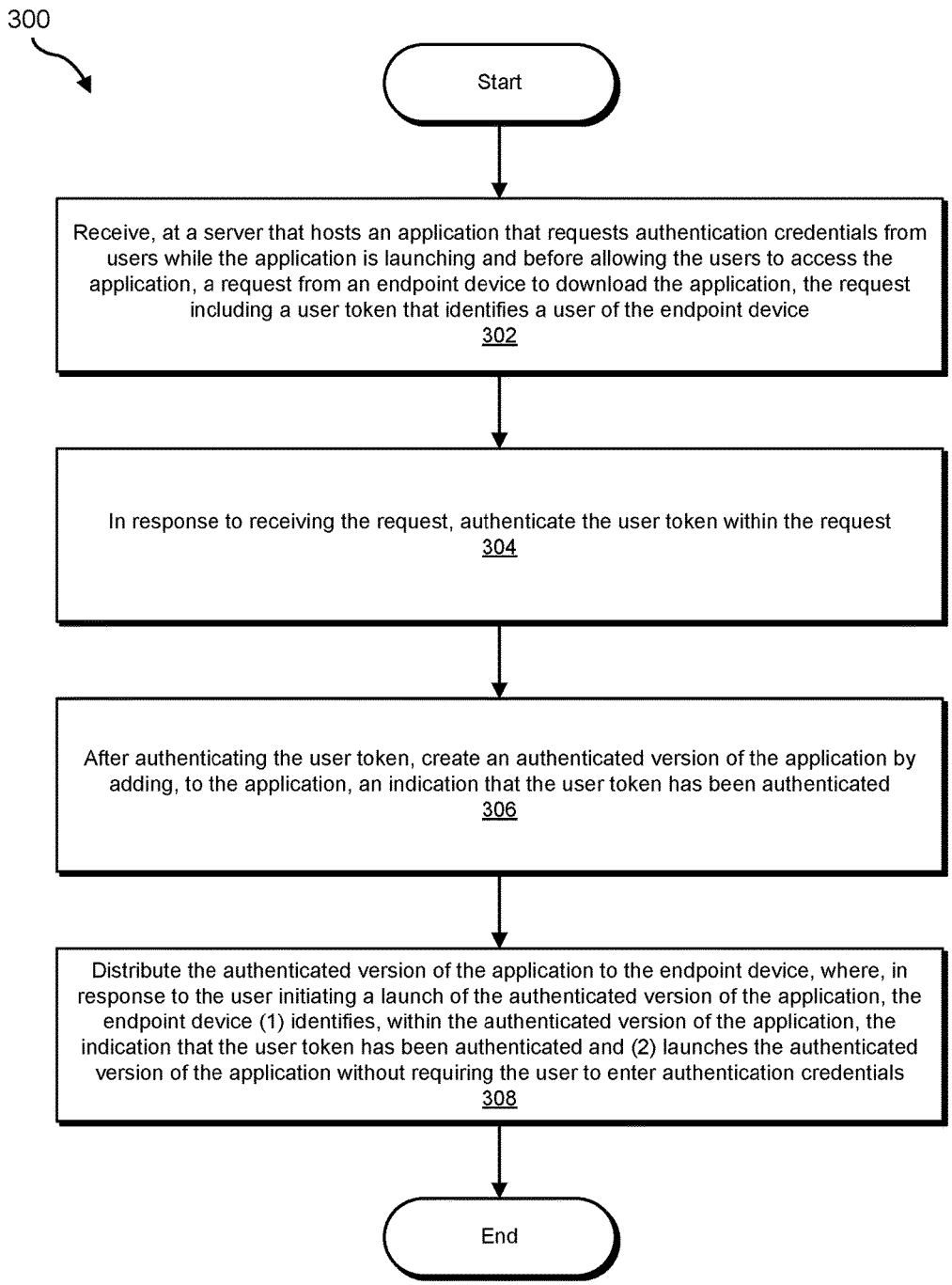
FIG. 3 is a flow diagram of an exemplary method for enabling users to launch applications without entering authentication credentials.

FIG. 3 is a flow diagram of an exemplary computer-implemented method 300 for enabling users to launch applications without entering authentication credentials. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive, at a server that hosts an application that requests authentication credentials from users while the application is launching and before allowing the users to access the application, a request from an endpoint device to download the application, where the request includes a user token that identifies a user of the endpoint device. For example, reception module 104 may, as part of server 206 in FIG. 2, receive request 208 to download application 212 from endpoint device 202, and request 208 may include user token 210 identifying a user of endpoint device 202.

The term "application," as used herein, generally refers to any type or form of collection of files, software, or executable code configured to provide one or more services or complete one or more tasks. Examples of applications include, without limitation, media applications, messaging applications, gaming applications, security applications, work-related applications, cloud-based applications, applications downloaded onto personal computing devices, variations of one or more of the same, combinations of one or more of the same, and/or any additional type of application. In exemplary embodiments, the systems described herein may authenticate and distribute applications configured to operate on iOS devices.

In addition, a server may host an application in a variety of ways. In some examples, a server may store one or more copies of an application (and/or be in communication with a database or additional storage device that stores the application) and provide a copy of the application to a user upon request. Furthermore, a server that hosts an application may be managed by the same entity responsible for creating the application or by a third-party entity (e.g., an organization that distributes the application to members of the organization).

In some examples, an application may require or request authentication credentials of a user before permitting the user to interact with and/or access content stored within the application. The term "authentication credentials," as used herein, generally refers to any type or form of code, sequence, string, or text that verifies the identity of a user or entity. In one example, a user's authentication credentials may include a username and password generated by the user. Additionally, in some embodiments, an application may associate particular authentication credentials with a user's account and only permit the user to access the account after receiving and verifying the authentication credentials.

In addition, the term "user token," as used herein, generally refers to any type or form of digital identification of a user and/or a user's device. For example, a user token may include a code or sequence associated with and/or assigned to a particular user. Additionally or alternatively, a user token may represent or incorporate authentication credentials of a user (e.g., a username and password) that the user may provide to access an application, account, or other service. In some embodiments, an organization may create a unique user token for each user within an organization. The users may then provide their unique user tokens to one or more services or applications managed by the organization in order to receive access to and/or be authenticated to the services or applications. Moreover, a user token may be generated using any type or form of encoding, encryption, or additional security measure.

The systems described herein may receive a request containing a user token to download an application in a variety of ways. In some examples, reception module 104 may receive such a request from an endpoint device after token module 112 generates a user token identifying the user of the endpoint device and distributes the user token to the endpoint device. For example, token module 112 may send the user token to the user of the endpoint device in an electronic message (e.g., an email) that prompts the user to request to download the application.

Figure 4:
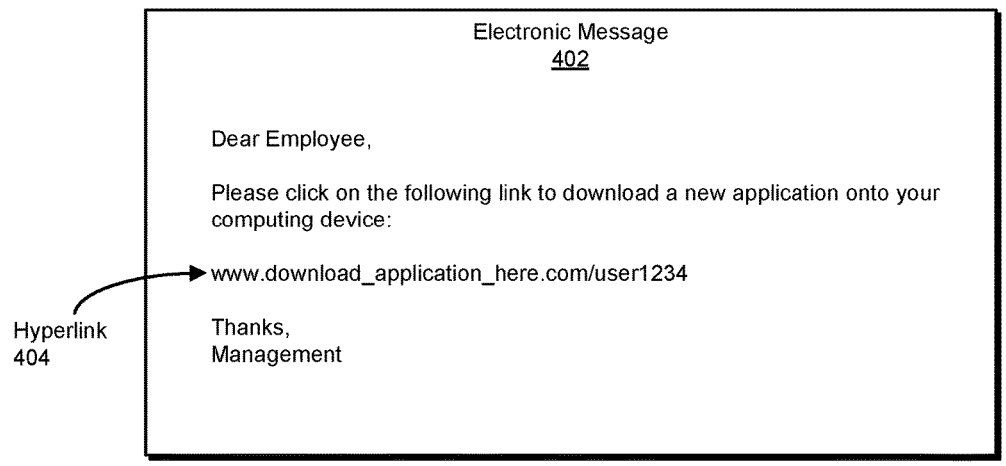
FIG. 4 is an illustration of an exemplary electronic message sent to a user that prompts the user to download an application.

In an exemplary embodiment, token module 112 may distribute an email to a user that prompts the user to download an application by clicking on a hyperlink within the email. As an example, FIG. 4 illustrates an electronic message 402 that directs an employee within an organization to download an application by clicking on a hyperlink 404. As shown in FIG. 4, hyperlink 404 may direct a browser running on the employee's device to a webpage with a URL "www.download_application_here.com/user1234." In this example, "www.download_application_here.com" may direct the browser to a server that hosts the application and "user1234" may represent a user token that identifies the employee.

Token module 112 may prompt a user to request to download an application using a user token in any additional or alternative manner, such as via a Short Message Service (SMS) message or via an online platform. In addition, token module 112 may encode a user token into a request in any suitable manner, such as by creating a separate link or generating a Quick Response (QR) code that contains the user token. Alternatively, instead of providing a user token for a user to use while requesting to download an application, token module 112 may prompt the user to enter a user token known by the user (e.g., a password previously created by the user) to request to download the application.

Returning to FIG. 3, at step 304 one or more of the systems described herein may, in response to receiving the request, authenticate the user token within the request. For example, authentication module 106 may, as part of server 206 in FIG. 2, authenticate user token 210 in response to receiving request 208.

The systems described herein may authenticate a user token in a variety of ways. In some examples, authentication module 106 may search each received request to download an application for an indication of a user token. In the event that authentication module 106 identifies a user token within a request, authentication module 106 may attempt to verify or authenticate the user token. In some examples, authentication module 106 may simply compare the user token to a list or database of known user tokens. In the event that a user token has been encoded and/or encrypted in a request, authentication module 106 may parse or decrypt the user token in order to verify the user token.

In the example of FIG. 4, after the employee clicks on hyperlink 404 and the employee's web browser calls the URL within hyperlink 404 from the server that hosts the application, authentication module 106, implemented at the server, may identify "user1234" within the URL. Authentication module 106 may then determine that "user1234" represents the user token of the employee. Therefore, authentication module 106 may authenticate the employee's request to download the application.

Returning to FIG. 3, at step 306 one or more of the systems described herein may, after authenticating the user token, create an authenticated version of the application by adding, to the application, an indication that the user token has been authenticated. For example, after user token 210 has been authenticated, creation module 108 may, as part of server 206 in FIG. 2, create authenticated application 214 by adding indication 216 to application 212.

The terms "indication" and "authentication indication," as used herein, generally refer to any type or form of digital mark within or attached to an application that signals or communicates that the application has been requested or accessed by an authenticated user or endpoint device. An authentication indication may include any type or form of authentication information, such as information included within a user token, authentication credentials that enable a user to access an application, or simply an indication that a user token has been authenticated.

The systems described herein may add an authentication indication to an application in a variety of ways. In some examples, creation module 108 may attach or append an authentication indication (e.g., in a file separate from the application package). In other examples, creation module 108 may insert an authentication indication directly into an application package.

In some embodiments, creation module 108 may add an authentication indication to an application package that has been digitally signed or encrypted by a creator or publisher of the application. In these embodiments, creation module 108 may add the authentication indication without re-signing the application package. For example, some application package formats (e.g., .ipa files) may permit new empty directories (e.g., application files) to be added to the application while the application is signed but prohibit existing directories from being modified while the application is signed. As such, creation module 108 may add an authentication indication to an application package by creating one or more new empty directories in the application package and then naming the new empty directories based on an authenticated user token. In one example, the name of a new empty directory may include the entirety of the user token (e.g., in the example of FIG. 4, creation module 108 may name a directory "user1234"). In other examples, creation module 108 may name the directory to simply indicate that a user token has been authentication (e.g., creation module 108 may name a directory "authenticated token"). By adding an authentication indication to one or more new empty directories created within an application, the systems described herein may avoid the time and computing resources involved in accessing a digital key used to sign an application, decrypting the application based on the digital key, and then re-signing the application after adding the authentication indication to the application.

Returning to FIG. 3, at step 308 one or more of the systems described herein may distribute the authenticated version of the application to the endpoint device, where, in response to the user initiating a launch of the authenticated version of the application, the authenticated version of the application identifies the authentication indication within the authenticated version of the application and the endpoint device launches the authenticated application without requiring the user to enter authentication credentials. For example, distribution module 110 may, as part of server 206 in FIG. 2, distribute authenticated application 214 to endpoint device 202, where, in response to the user initiating a launch of authenticated application 214, authenticated application 214 identifies indication 216 within authenticated application 214 and endpoint device 202 launches authenticated application 214 without requiring the user to enter authentication credentials.

The systems described herein may distribute an authenticated version of an application in a variety of ways. In some examples, distribution module 110 may directly send an authenticated application to a user's endpoint device (e.g., as a file attached to an email). In other examples, distribution module 110 may send a link to download an authenticated version of an application. For example, distribution module 110 may send an endpoint device a link that contains a path to a manifest file associated with an authenticated application. The manifest file may include application metadata and a download link necessary for an operating system of an endpoint device to download and install the application. Moreover, in some embodiments, distribution module 110 may prompt a user of an endpoint device to click on a link to a manifest file to initiate downloading an authenticated application. In other embodiments, distribution module 110 may prompt a user's endpoint device to initiate downloading an authenticated application without requiring user input.

After a user's endpoint device receives an authenticated version of an application, the endpoint device may install the authenticated application onto the endpoint device. For example, the endpoint device may perform any steps or processes generally involved in installing an application, such as decompressing (e.g., unzipping) the application in the event that it was compressed (e.g., zipped) and running an executable file or other script that facilitates installing the application onto an operating system of the endpoint device.

After an endpoint device installs an authenticated version of an application, the endpoint device and/or application may detect an attempt to launch the application. The attempt to launch the application may occur immediately after the application has been installed and/or at any later point in time. For example, an attempt to launch an authenticated application may be initiated by a user (e.g., by the user clicking on a shortcut or opening an executable file of the application) and/or by an endpoint device (e.g., the endpoint device may automatically launch the application after installation is complete).

While an endpoint device is launching an authenticated application, the endpoint device and/or the authenticated application may identify the authentication indication within the application. For example, the systems described herein may configure an application to search for an authentication indication in a particular location or in a particular manner during a launch of the application. In an exemplary embodiment, distribution module 110 may configure an application to search for a directory named after an authenticated user token.

After an authenticated application and/or endpoint device identifies an authentication indication within the application, the application and/or endpoint device may use the authentication indication to complete launching the application without requiring a user to enter authentication credentials. In some examples, an authentication indication may directly contain authentication credentials that authenticate a user to an application. In these examples, the systems described herein may configure an application to determine that a user's endpoint device has permission to access the application simply based on identifying the authentication credentials of the user within the application. Additionally or alternatively, the endpoint device launching the application may be configured to provide the authentication credentials to the application or a remote security server responsible for verifying the authentication credentials. Once the authentication credentials have been verified, the application may launch without requiring any additional authentication from the user.

In other examples, authentication credentials necessary to authenticate a user to an application may be stored remotely (e.g., in a server that hosts an application and/or adds an authentication indication to the application). For example, while generating user tokens to facilitate one or more users downloading an authenticated version of an application, the systems described herein may generate and/or store authentication credentials associated with the users that may be used to authenticate the users to the application. In these examples, identifying an authentication indication during a launch of an application may trigger the application to query the server that stores authentication credentials for the user.

Specifically, the application may send, to the server, a request to receive the authentication credentials. In addition, the application may send information that identifies the user and/or the endpoint device that is launching the application, such as the authentication indication within the application, a user token of the user, and/or a code or sequence that identifies the endpoint device within a network or organization. When the server receives the request and the information identifying the user and/or the endpoint device, the server may provide appropriate authentication credentials for the endpoint device based on the identification information. For example, the server may associate the user with the endpoint device and then look up previously-stored authentication credentials of the user. The server may then send the authentication credentials to the endpoint device. Once the endpoint device receives the authentication credentials, the application may identify and/or verify the authentication credentials and determine that the application has permission to be launched on the endpoint device.

Notably, the systems described herein may enable a user to bypass or skip one or more user interfaces that prompt the user to provide authentication credentials during a launch of an application. For example, the disclosed systems may prompt an application or endpoint device to not display such user interfaces and/or to provide authentication credentials to the user interfaces without input from the user. As such, the user may be quickly and effortlessly granted access to the application.

In some examples, an application may use authentication credentials identified within the application and/or received from a server that stores authentication credentials to perform additional tasks after the application is launched. For example, the application may use the authentication credentials to send and receive authenticated communications to and from the server. Specifically, during operation of the application, the application may attach or include the authentication credentials within a message sent to the server. The message may include any information related to the operation of the application and/or a request for any type of additional information. Once the server receives the message, the server may identify the authentication credentials within the message to identify and/or verify the user of the endpoint device that is executing the application. The server may then reply to the message, record information included within the message, and/or respond to the message in any additional manner.

Figure 5:
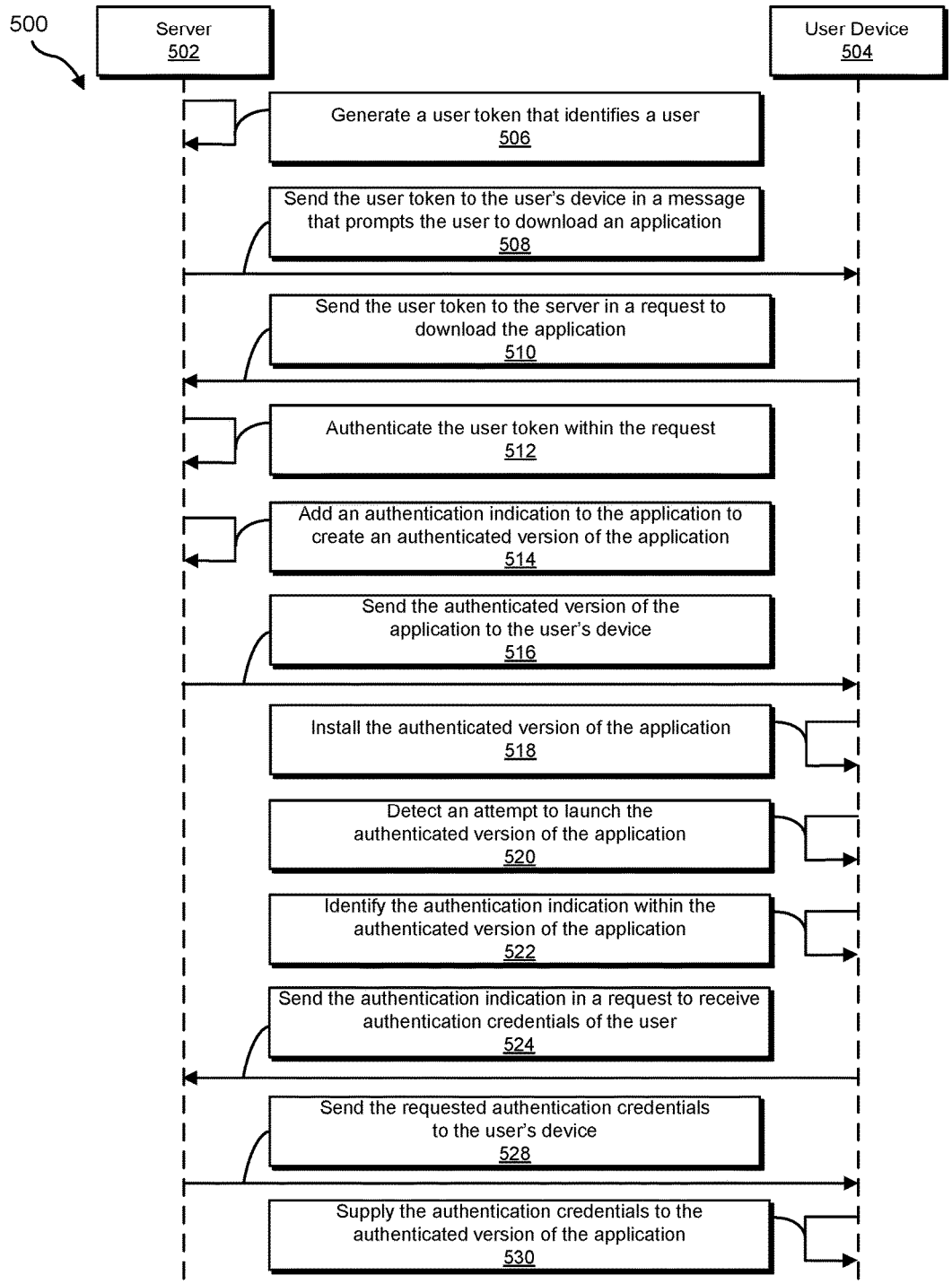
FIG. 5 is a flow diagram of an additional exemplary method for enabling users to launch applications without entering authentication credentials.

FIG. 5 illustrates an exemplary method 500 for enabling a user to launch an application without entering authentication credentials. In particular, FIG. 5 demonstrates the interactions between a server 502 that generates authenticated versions of an application (e.g., an iOS application) and a user device 504 (e.g., an iOS device) that receives an authenticated version of the application. At step 506, server 502 may generate a user token that identifies a user (i.e., a user of user device 504). At step 508, server 502 may send the user token to the user's device in a message that prompts the user to download an application. At step 510, user device 504 (directed by the user) may send the user token to server 502 in a request to download the application. At step 512, server 502 may authenticate the user token within the request. Next, at step 514, server 502 may add an authentication indication to the application to create an authenticated version of the application.

At step 516, server 502 may send the authenticated version of the application to user device 504. At step 518, user device 504 may install the authenticated version of the application. At step 520, user device 504 may detect an attempt to launch the authenticated version of the application. Next, at step 522, user device 504 may step 524, user identify the authentication indication within the authenticated version of the application. At device 504 may send the authentication indication in a request to receive authentication credentials of the user that authenticate the user to the application. At step 526, server 502 may send the requested authentication credentials to user device 504. Finally, at step 530, user device 504 may supply the authentication credentials to the authenticated version of the application. As such, the user of user device 504 may be authenticated to the application without entering authentication credentials into the application.

Figure 6:
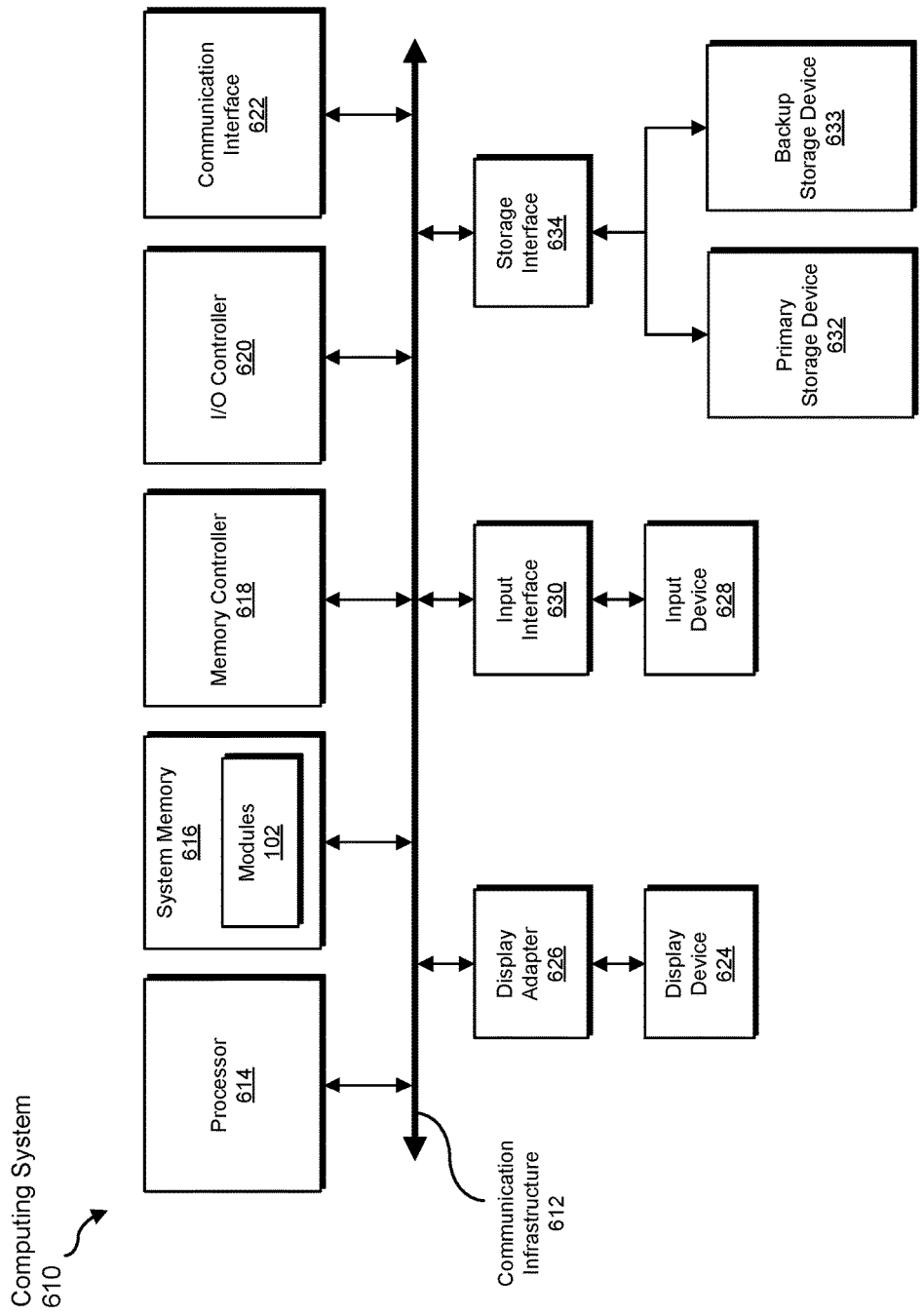
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
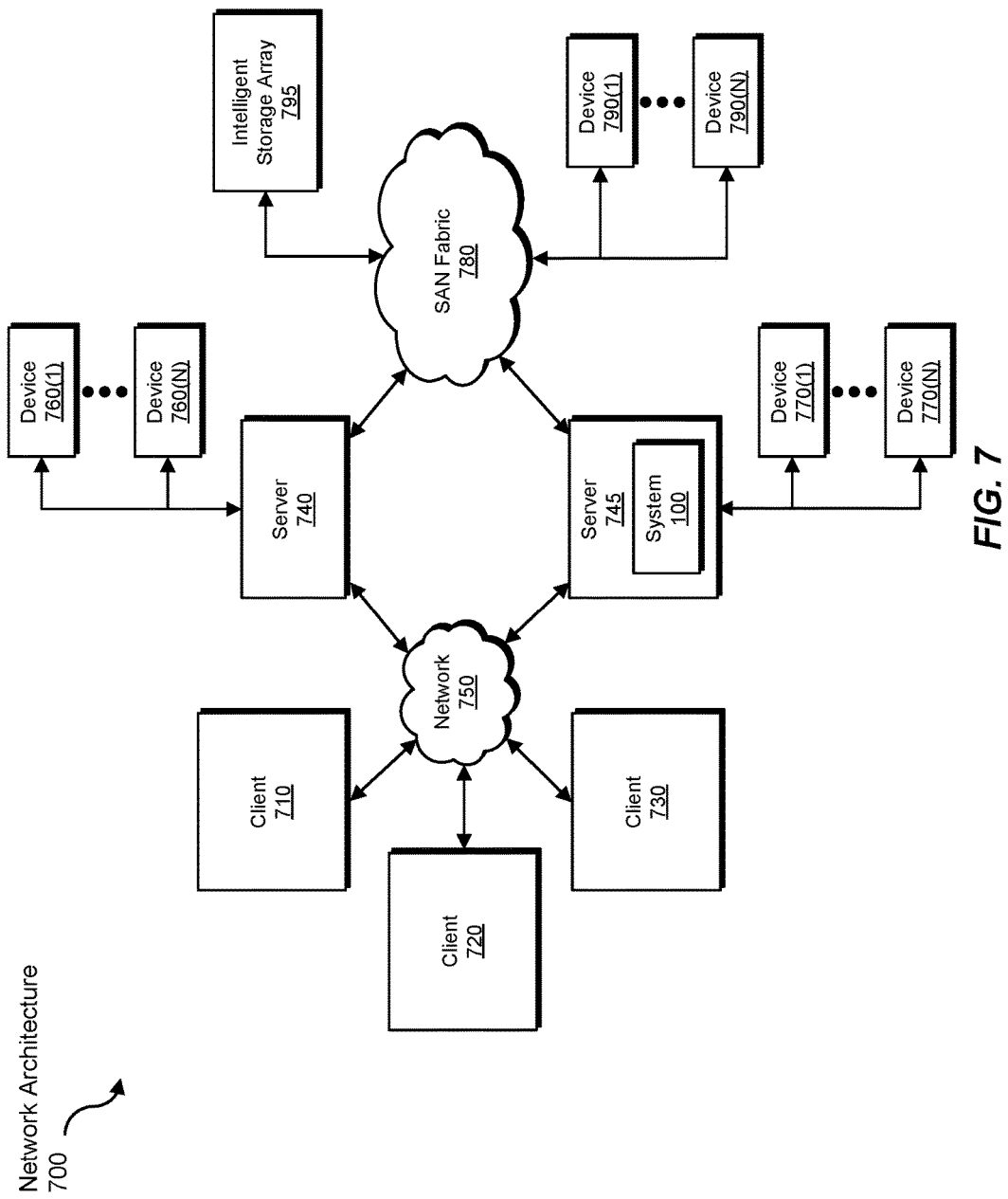
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enabling users to launch applications without entering authentication credentials.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to download an application, transform the request into an authenticated version of the application, output a result of the transformation to a user that requested to download the application, use the result of the transformation to enable the user to launch the application without entering authentication credentials, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enabling users to launch applications without entering authentication credentials, at least a portion of the method being performed by a computing device comprising at least one processor, the method comprising:

receiving, at a server that hosts an application that requests authentication credentials from users while the application is launching and before allowing the users to access the application, a request from an endpoint device to download the application, the request including a user token that identifies a user of the endpoint device;

in response to receiving the request, authenticating the user token within the request;

after authenticating the user token, creating an authenticated version of the application by adding, to a version of the application that has been signed by a publisher of the application, an indication that the user token has been authenticated, wherein adding the indication is performed without re-signing the signed version of the application;

distributing the authenticated version of the application to the endpoint device, where, in response to the user initiating a launch of the authenticated version of the application, the endpoint device:

identifies, within the authenticated version of the application, the indication that the user token has been authenticated;

launches the authenticated version of the application without requiring the user to enter authentication credentials.

2. The method of claim 1, further comprising, prior to receiving the request from the endpoint device to download the application:

generating the user token that identifies the user of the endpoint device;

distributing the user token to the user of the endpoint device in an electronic message that prompts the user to request to download the application.

3. The method of claim 2, wherein the electronic message prompts the user to click a hyperlink comprising the user token.

4. The method of claim 3, wherein authenticating the user token within the request comprises identifying the user token within a uniform resource locator of the hyperlink.

5. The method of claim 1, wherein adding the indication that the user token has been authenticated to the application comprises:

creating at least one new directory within the application;

naming the new directory based on the authenticated user token.

6. The method of claim 1, wherein the server stores authentication credentials of the user that authenticate the user to the application.

7. The method of claim 6, wherein the endpoint device launches the authenticated version of the application without requiring the user to enter authentication credentials by:
 in response to identifying the indication that the user token has been authenticated, sending the user token to the server in a request to receive the authentication credentials that authenticate the user to the application;
 receiving, from the server, the authentication credentials that authenticate the user to the application;
 supplying the authentication credentials to the application.

8. A system for enabling users to launch applications without entering authentication credentials, the system comprising:
 a reception module, stored in memory, that receives, at a server that hosts an application that requests authentication credentials from users while the application is launching and before allowing the users to access the application, a request from an endpoint device to download the application, the request including a user token that identifies a user of the endpoint device;
 an authentication module, stored in memory, that authenticates the user token within the request in response to receiving the request;
 a creation module, stored in memory, that creates, after the user token is authenticated, an authenticated version of the application by adding, to a version of the application that has been signed by a publisher of the application, an indication that the user token has been authenticated, wherein adding the indication is performed without re-signing the signed version of the application;
 a distribution module, stored in memory, that distributes the authenticated version of the application to the endpoint device, where, in response to the user initiating a launch of the authenticated version of the application, the endpoint device:
  identifies, within the authenticated version of the application, the indication that the user token has been authenticated;
  launches the authenticated version of the application without requiring the user to enter authentication credentials;
 at least one hardware processor configured to execute the reception module, the authentication module, the creation module, and the distribution module.

9. The system of claim 8, further comprising a token module that, prior to the request from the endpoint device to download the application is received:
 generates the user token that identifies the user of the endpoint device;
 distributes the user token to the user of the endpoint device in an electronic message that prompts the user to request to download the application.

10. The system of claim 9, wherein the electronic message prompts the user to click a hyperlink comprising the user token.

11. The system of claim 10, wherein the authentication module authenticates the user token within the request by identifying the user token within a uniform resource locator of the hyperlink.

12. The system of claim 8, wherein the creation module adds the indication that the user token has been authenticated to the application by:
 creating at least one new directory within the application;
 naming the new directory based on the authenticated user token.

13. The system of claim 8, wherein the server stores authentication credentials of the user that authenticate the user to the application.

14. The system of claim 13, wherein the endpoint device launches the authenticated version of the application without requiring the user to enter authentication credentials by:
 in response to identifying the indication that the user token has been authenticated, sending the user token to the server in a request to receive the authentication credentials that authenticate the user to the application;
 receiving, from the server, the authentication credentials that authenticate the user to the application;
 supplying the authentication credentials to the application.

15. A non-transitory computer-readable medium comprising one or more computer-readable instructions that, when executed by at least one processor of a computing device, cause the computing device to:
 receive, at a server that hosts an application that requests authentication credentials from users while the application is launching and before allowing the users to access the application, a request from an endpoint device to download the application, the request including a user token that identifies a user of the endpoint device;
 in response to receiving the request, authenticate the user token within the request;
 after authenticating the user token, create an authenticated version of the application by adding, to a version of the application that has been signed by a publisher of the application, an indication that the user token has been authenticated, wherein adding the indication is performed without re-signing the signed version of the application;
 distribute the authenticated version of the application to the endpoint device, where, in response to the user initiating a launch of the authenticated version of the application, the endpoint device:
  identifies, within the authenticated version of the application, the indication that the user token has been authenticated;
  launches the authenticated version of the application without requiring the user to enter authentication credentials.

16. The computer-readable medium of claim 15, wherein before the request from the endpoint device to download the application is received, the one or more computer-readable instructions cause the computing device to:
 generate the user token that identifies the user of the endpoint device;
 distribute the user token to the user of the endpoint device in an electronic message that prompts the user to request to download the application.

17. The computer-readable medium of claim 16, wherein the electronic message prompts the user to click a hyperlink comprising the user token.

18. The computer-readable medium of claim 17, wherein the one or more computer-readable instructions cause the computing device to authenticate the user token within the request by identifying the user token within a uniform resource locator of the hyperlink.

\* \* \* \* \*